US008411154B2

(12) United States Patent
Shimizu

(10) Patent No.: US 8,411,154 B2
(45) Date of Patent: Apr. 2, 2013

(54) IMAGE PROCESSING APPARATUS FOR CALCULATING GLOBAL MOTION VECTOR OF PLURALITY OF IMAGE FRAMES

(75) Inventor: Hiroshi Shimizu, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 823 days.

(21) Appl. No.: 12/125,234

(22) Filed: May 22, 2008

(65) Prior Publication Data

US 2008/0291285 A1 Nov. 27, 2008

(30) Foreign Application Priority Data

May 24, 2007 (JP) ................................ 2007-137926

(51) Int. Cl.
*H04N 5/228* (2006.01)
*G06K 9/00* (2006.01)

(52) U.S. Cl. .................................... 348/208.4; 382/107

(58) Field of Classification Search ............... 348/208.1, 348/208.6, 208.5, 208.4, 208.99–208.7, 208.14, 348/222.1, 170; 382/107; 396/153
See application file for complete search history.

(56) References Cited

U.S. PATENT DOCUMENTS

| | | | | |
|---|---|---|---|---|
| 6,512,537 | B1 * | 1/2003 | Shimizu et al. | 348/155 |
| 7,177,359 | B2 * | 2/2007 | Song et al. | 375/240.16 |
| 7,605,845 | B2 * | 10/2009 | Batur | 348/208.6 |
| 7,634,143 | B2 | 12/2009 | Saito | |
| 2006/0244836 | A1 * | 11/2006 | Batur | 348/208.1 |
| 2007/0092009 | A1 | 4/2007 | Muraki | |

FOREIGN PATENT DOCUMENTS

| | | |
|---|---|---|
| JP | 2004-015376 A | 1/2004 |
| JP | 2005-321902 A | 11/2005 |
| JP | 2007-122275 A | 5/2007 |

OTHER PUBLICATIONS

Japanese Office Action dated May 10, 2011 (and English translation thereof) in counterpart Japanese Application No. 2007-137926.

* cited by examiner

*Primary Examiner* — Chieh M Fan
*Assistant Examiner* — Ahmed A Berhan
(74) *Attorney, Agent, or Firm* — Holtz, Holtz, Goodman & Chick, P.C.

(57) ABSTRACT

An imaging device performs a process for dividing each of a plurality of image frames constituting moving image information generated by an imaging unit into a plurality of blocks; a process for tracking predetermined ones of the obtained blocks in one of two image frames before and after the image frame of interest to calculate a plurality of motion vectors of the blocks, respectively; a process for comparing one of the calculated motion vectors with each of other motion vectors, the one motion vector serving as an evaluation target, thereby calculating a global motion vector of the one image frame; and a process for excluding blocks present within a predetermined distance from one block related to one motion vector serving as the evaluation target from comparison targets the motion vectors of which are to be compared with the one motion vector, when the global motion vector calculation unit calculates the global motion vector.

5 Claims, 7 Drawing Sheets

F
MB
MB
MB
MB
R

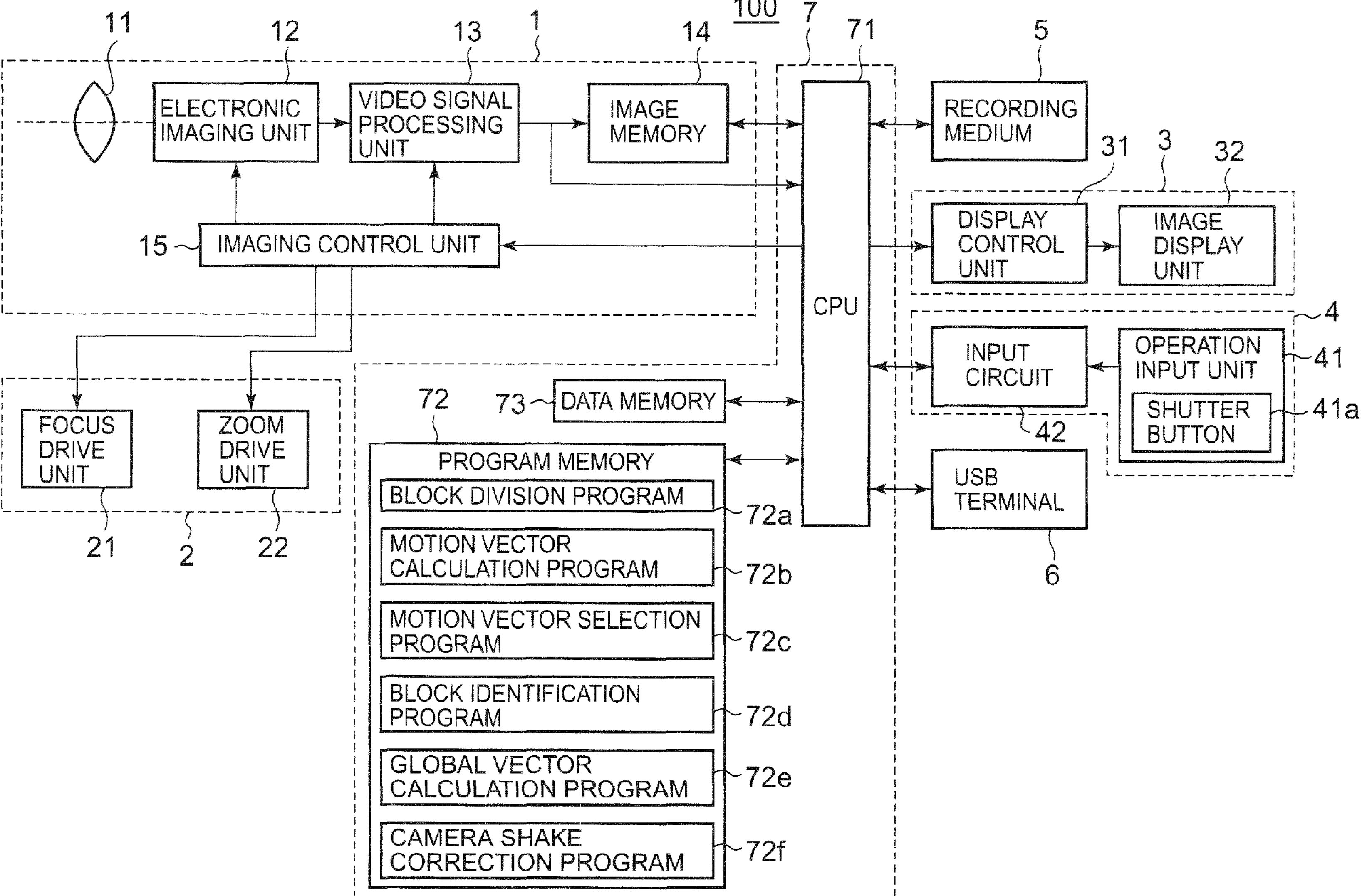
FIG. 1
100
11
12
ELECTRONIC IMAGING UNIT
13
VIDEO SIGNAL PROCESSING UNIT
14
IMAGE MEMORY
1
15
IMAGING CONTROL UNIT
FOCUS DRIVE UNIT
ZOOM DRIVE UNIT
21
2
22
7
71
CPU
5
RECORDING MEDIUM
31
3
32
DISPLAY CONTROL UNIT
IMAGE DISPLAY UNIT
4
INPUT CIRCUIT
OPERATION INPUT UNIT
41
SHUTTER BUTTON
41a
42
USB TERMINAL
6
72
73
DATA MEMORY
PROGRAM MEMORY
BLOCK DIVISION PROGRAM
72a
MOTION VECTOR CALCULATION PROGRAM
72b
MOTION VECTOR SELECTION PROGRAM
72c
BLOCK IDENTIFICATION PROGRAM
72d
GLOBAL VECTOR CALCULATION PROGRAM
72e
CAMERA SHAKE CORRECTION PROGRAM
72f

F
MB
MB
MB
MB

F
MB
MB
MB
MB
A
A
A
A

F
MB
MB
MB
MB
MB
MB
MB
MB
A
A

F
MB
MB
MB
MB
R

IMAGE PROCESSING APPARATUS FOR CALCULATING GLOBAL MOTION VECTOR OF PLURALITY OF IMAGE FRAMES

CROSS REFERENCE TO RELATED APPLICATIONS

This application is based upon and claims the benefit of priority from a Japanese Patent Application No. TOKUGAN 2007-137926, filed on May 24, 2007; the entire contents of which are incorporated herein by reference.

BACKGROUND OF THE INVENTION

1. Field of the Invention

The present invention relates to an image processing apparatus for calculating a global motion vector of a plurality of image frames constituting moving image information.

2. Description of the Related Art

There is conventionally known an imaging device, e.g., a digital camera, that corrects a camera shake caused by picking up a moving image by image processing, i.e., makes a so-called camera shake correction. A global motion vector of image frames necessary for the camera shake correction is calculated using a plurality of motion vectors calculated for fractionized small blocks, respectively. If a moving object is present in a screen, motion vectors related to moving object components different from those related to the camera shake are often locally present. When such motion vectors are present, the global motion vector cannot be calculated appropriately. Thus, as disclosed in Japanese Laid-Open Publication No. 2004-15376, there is proposed the following method of calculating a global motion vector. The method includes selecting only motion vectors in a range defined by an average value of motion vectors related to respective areas and a standard deviation thereof, obtaining contrast coefficients for the respective areas, obtaining weight coefficients based on the contrast coefficients, and then obtaining an average weight, thereby setting the obtained average weight as the global motion vector.

The conventional method described above has the following problems. If a moving object somewhat large in size is present in the screen, the large moving object influences the average value and the standard deviation based on which the determination is made, and the global motion vector cannot be appropriately calculated.

It is an object of the present invention to appropriately calculate a global motion vector of a plurality of image frames constituting moving image information.

SUMMARY OF THE INVENTION

According to the present invention, there is provided an image processing apparatus that divides at least one image frame out of a plurality of image frames constituting moving image information into a plurality of blocks; tracks one of the obtained blocks in one of two image frames before and after the one image frame, and calculates a plurality of motion vectors of the blocks, respectively; compares one of the calculated motion vectors with each of other motion vectors, the one motion vector serving as an evaluation target, thereby calculating a global motion vector of the one image frame; and excludes blocks present within a predetermined distance from one block related to one motion vector serving as the evaluation target from comparison targets the motion vectors of which are to be compared with the one motion vector, when the global motion vector calculation unit calculates the global motion vector.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 1 is a block diagram showing a schematic configuration of an imaging device according to an embodiment of the present invention;

DETAILED DESCRIPTION OF THE PREFERRED EMBODIMENTS

Figure 2:
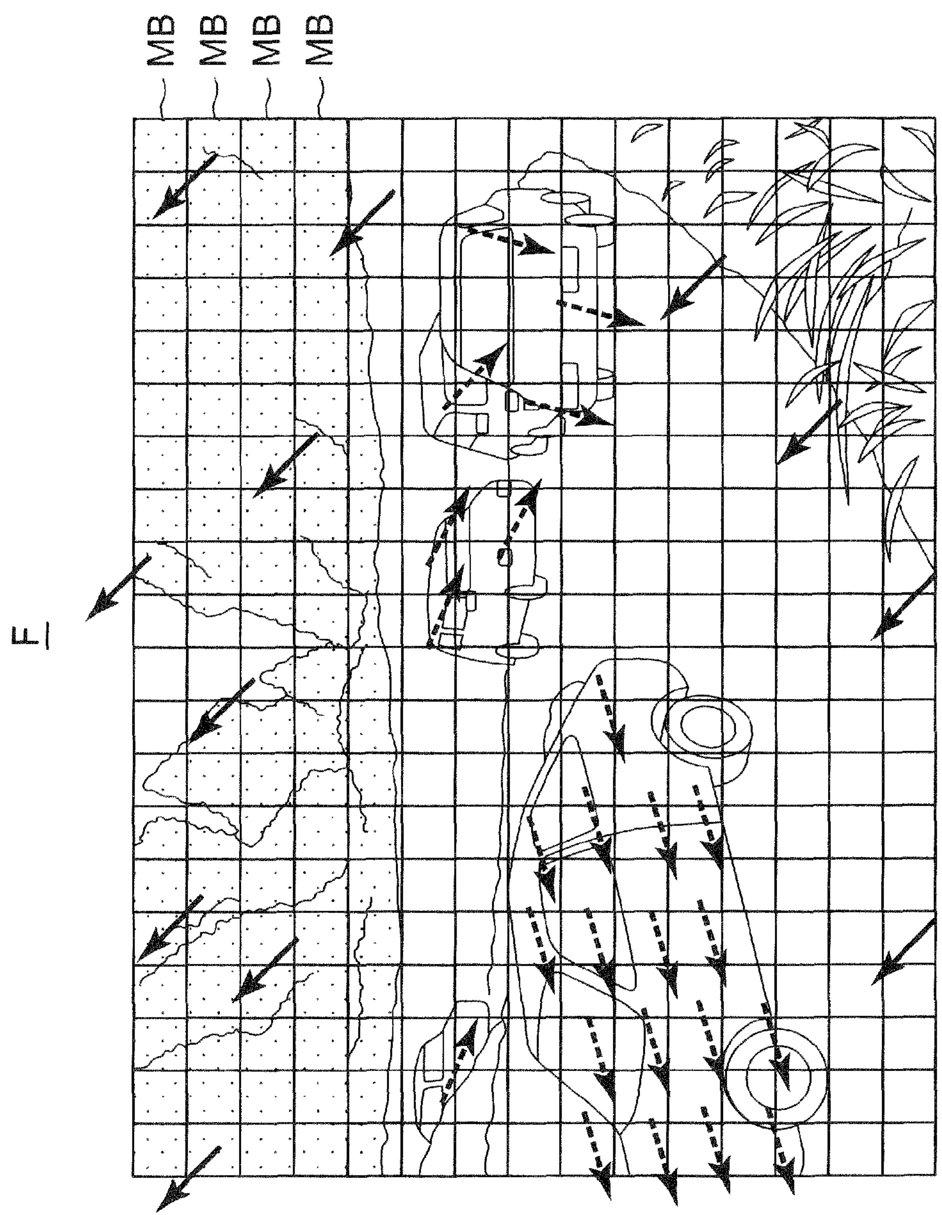
FIG. 2 is a diagram schematically showing an example of an image displayed on a display unit of the imaging device shown in FIG. 1.

A specific embodiment of the present invention is explained with reference to the drawings. Note that the scope of the present invention is not limited to an illustrated example. FIG. 1 is a block diagram showing a schematic configuration of an imaging device 100 according to an embodiment of the present invention.

At the time of calculating a global motion vector of a plurality of image frames F generated by picking up a moving image, the imaging device 100 according to the embodiment excludes motion vectors of blocks present within a predetermined distance d from a block related to a motion vector serving as an evaluation target (hereinafter, often "evaluation target motion vector") from motion vectors serving as comparison targets (hereinafter, often "comparison target motion vector"), among those related to a plurality of macro-blocks MB constituting each image frame F, and determines whether to vote for the evaluation target motion vector by comparing the evaluation target motion vector with the other motion vectors. Specifically, the imaging device 100 includes an imaging unit 1, an auxiliary imaging unit 2, a display unit 3, an operation unit 4, a recording medium 5, a USB terminal 6, and a control unit 7, as shown in FIG. 1.

The imaging unit 1, which serves as imaging means, continuously images an object and generates the plural image frames F. Specifically, the imaging unit 1 includes an imaging lens assembly 11, an electronic imaging unit 12, a video signal processing unit 13, an image memory 14, an imaging control unit 15, and the like.

The imaging lens assembly 11 is configured to include a plurality of imaging lenses. The electronic imaging unit 12 is configured to include an image pickup device, e.g., a charge coupled device (CCD) or a complementary metal-oxide semiconductor (CMOS), converting an object image passing through the imaging lens assembly 11 into a two-dimensional image signal. The video signal processing unit 13 performs predetermined image processing on the image signal output from the electronic imaging unit 12. The image memory 14 temporarily stores therein the processed image signal.

The imaging control unit 15 controls the electronic imaging unit 12 and the video signal processing unit 13 under control of a CPU 71. Specifically, the imaging control unit 15 controls a process of the electronic imaging unit 12 imaging an object for predetermined exposure time, and a process of reading the image signal (image frames F) from an imaging region of the electronic imaging unit 12 at a predetermined frame rate.

The auxiliary imaging unit 2 is driven when the imaging unit 1 images an object, and includes a focus drive unit 21 and a zoom drive unit 22.

The focus drive unit 21 drives a focus mechanism (not shown) connected to the imaging lens assembly 11. The zoom drive unit 22 drives a zoom mechanism (not shown) connected to the imaging lens assembly 11. The focus drive unit 21 and the zoom drive unit 22 are connected to the imaging control unit 15 and operate under control of the imaging control unit 15.

The display unit 3 displays thereon the image picked up by the imaging unit 1 and includes a display control unit 31 and an image display unit 32.

Figure 5:
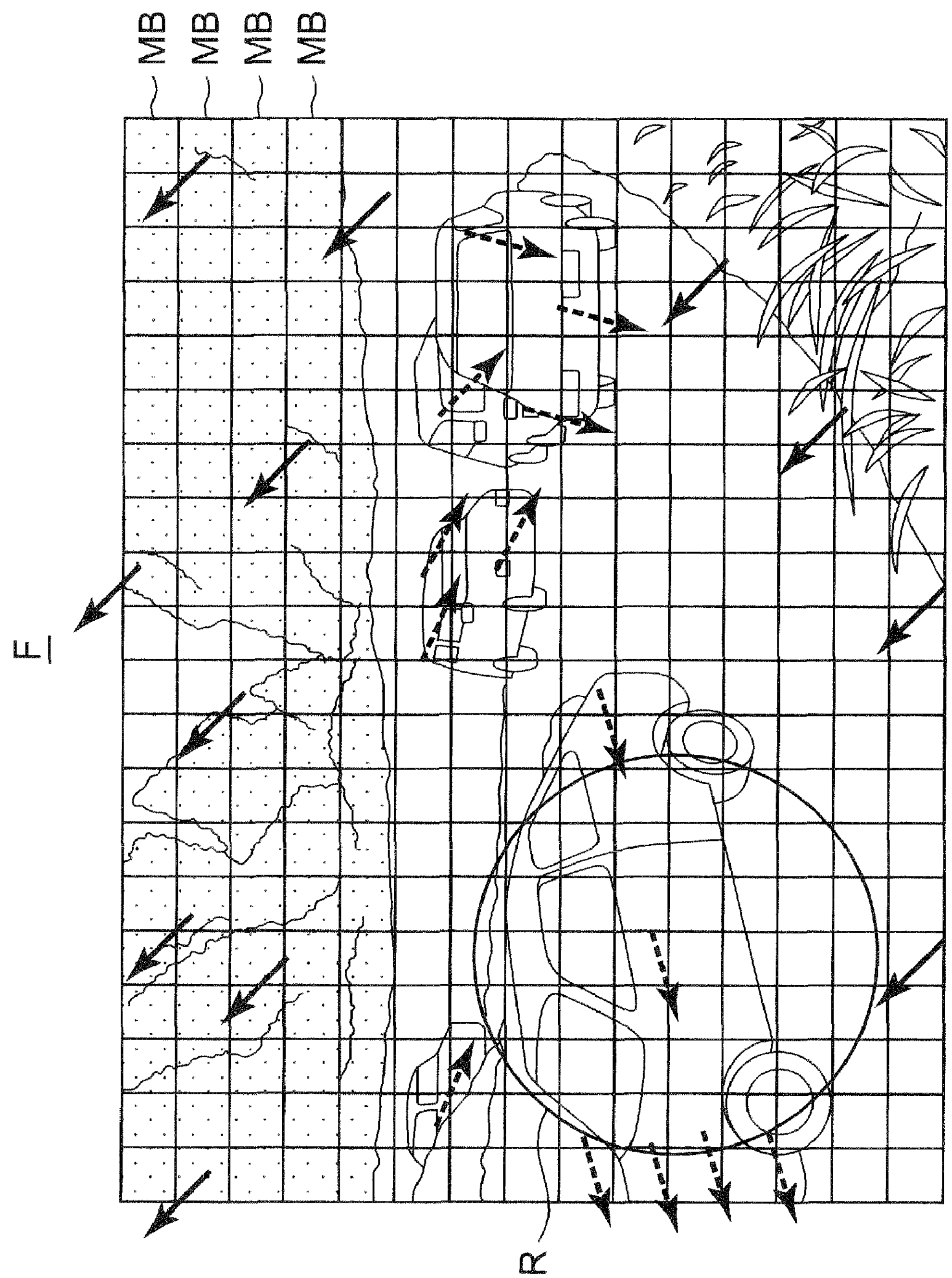
FIG. 5 is a diagram schematically showing another example of an image displayed on the display unit of the imaging device shown in FIG. 1.

The display control unit 31 includes a video memory (not shown) temporarily storing therein display data appropriately output from the CPU 71. The image display unit 32 includes a liquid crystal monitor displaying a predetermined image such as an image picked up by the imaging unit 1 based on an output signal from the display control unit 31 (see FIGS. 2, 5, and the like).

The operation unit 4 performs a predetermined operation for the imaging unit 100 and includes an operation input unit 41 and an input circuit 42.

The operation input unit 41 includes a shutter button 41*a* for inputting an operation signal for instructing the imaging unit 1 to image an object. The input circuit 42 inputs the operation signal input from the operation input unit 41 to the CPU 71.

The recording medium 5, which is configured to include a card-type nonvolatile memory (flash memory) or a hard disk, stores therein a plurality of image files of the images picked up by the imaging unit 1.

The USB terminal 6 is a terminal connected to an external device. The USB terminal 6 transmits or receives data to or from the external device via a USB cable (not shown) or the like.

The control unit 7 controls the constituent elements of the imaging device 100 and includes the CPU 71, a program memory 72, and a data memory 73.

The CPU 71 performs various control operations according to various processing programs for the imaging device 100 stored in the program memory 72.

The data memory 73, e.g., a flash memory, temporarily stores therein data or the like processed by the CPU 71.

The program memory 72 stores therein various programs necessary for the operation performed by the CPU 71, and data. Specifically, the program memory 72 stores therein a block division program 72*a*, a motion vector calculation program 72*b*, a motion vector selection program 72*c*, a block identification program 72*d*, a global motion vector calculation program 72*e*, a camera shake correction program 72*f*, and the like.

Figure 3:
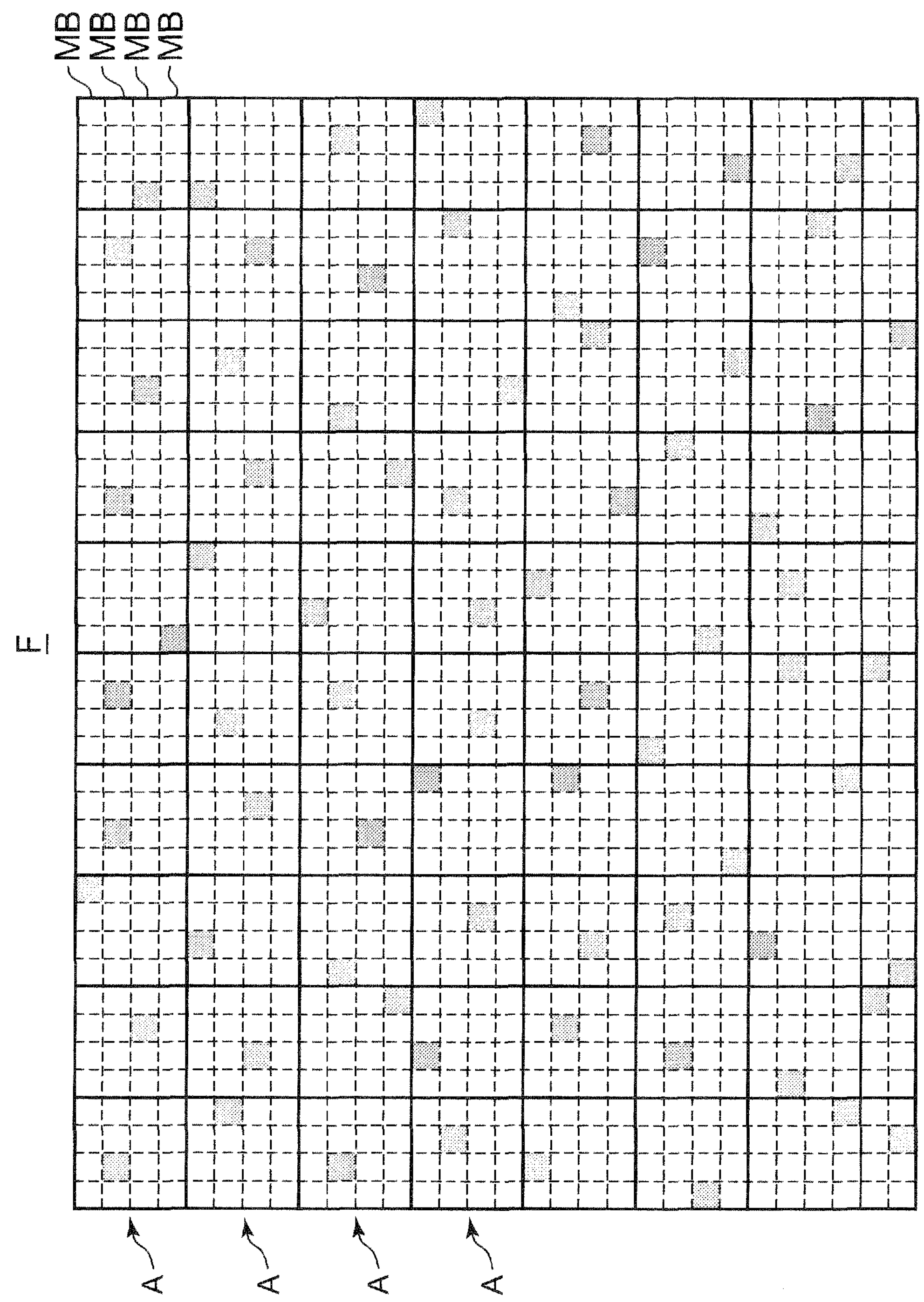
FIG. 3 is a diagram schematically showing an example of image frames generated by an imaging unit of the imaging device shown in FIG. 1.

The block division program 72*a* causes the CPU 71 to function as a block division unit. Namely, the block division program 72*a* causes the CPU 71 to realize a function related to execution of a block division process for dividing at least one of a plurality of image frames F (see FIG. 3) constituting moving image information generated by the imaging unit 1 into a plurality of blocks. Specifically, the CPU 71 executes the block division program 72*a*, thereby dividing one of the image frames F into macro-blocks MB constitute a square area of 16 pixels by 16 pixels.

The motion vector calculation program 72*b* causes the CPU 71 to function as a motion vector calculation unit. Namely, the motion vector calculation program 72*b* causes the CPU 71 to realize a function related to a motion vector calculation process for tracking a predetermined macro-block MB obtained by the block division process, in one of image frames F before and after the image frame F of interest, to calculate a motion vector of the predetermined macro-block. Specifically, when the CPU 71 executes the motion vector calculation program 72*b*, the CPU 71 divides one of the image frames F into areas A each constituted by the 4×4 macro-blocks MB, i.e., 16 macro-blocks MB in all. Further, the CPU 71 selects one characteristic macro-block MB from each area A. The CPU 71 tracks the selected macro-block MB in the image frame F right after (or right before) the image frame F of interest, thereby calculating a motion vector of the macro-block MB (see FIG. 2).

The motion vector selection program 72*c* causes the CPU 71 to function as a motion vector selection unit. Namely, the CPU 71 executes the motion vector selection program 72*c*, thereby randomly (arbitrarily) selecting one motion vector to serve as an evaluation target related to a global motion vector calculation process, to be described later, from among a plurality of motion vectors calculated by the motion vector calculation process (performs a random selection process).

Figure 4:
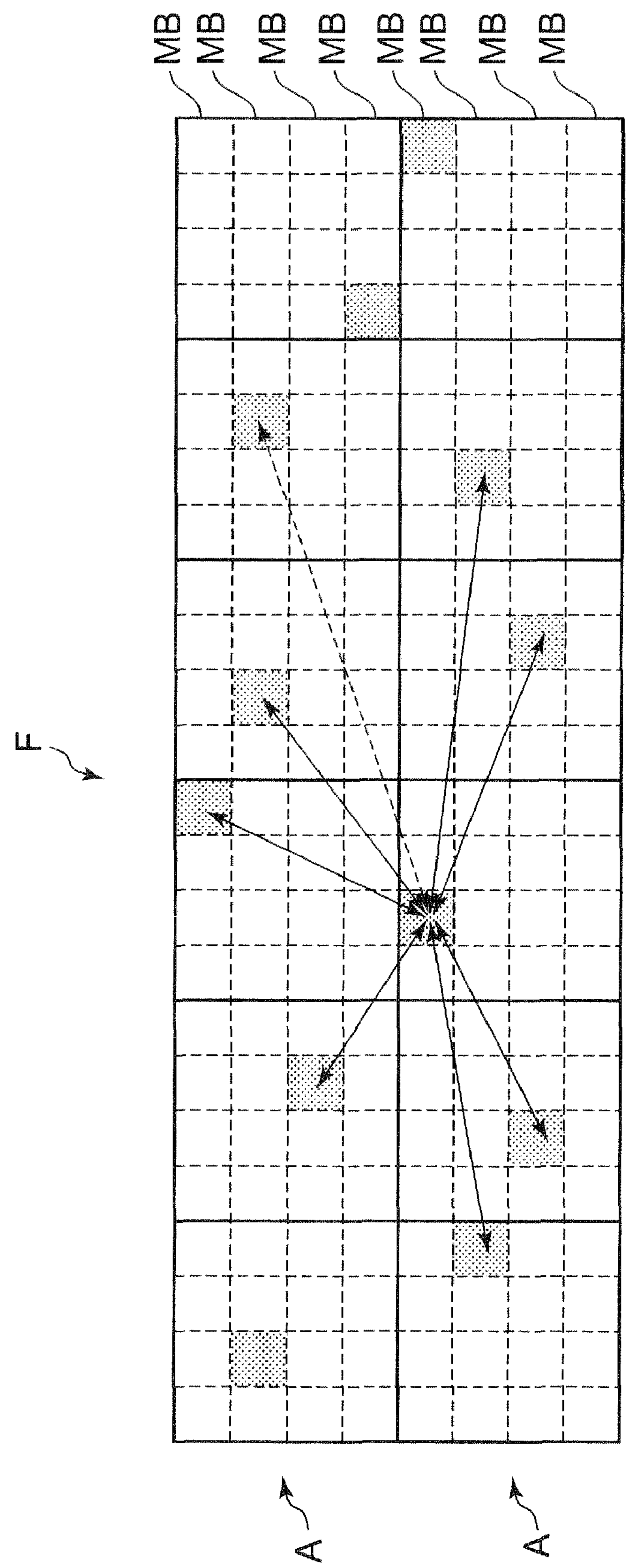
FIG. 4 is a diagram enlargedly and schematically showing a part of the image frames shown in FIG. 3.

The block identification program 72*d* causes the CPU 71 to function as a block identification unit. The block identification program 72*d* causes the CPU 71 to realize a function related to a block identification process for identifying macro-blocks MB to be excluded from comparison targets the motion vectors of which are to be compared with one evaluation target motion vector at the time of the global motion vector calculation process. Namely, The block identification program 72*d* causes the CPU 71 to realize a function related to a block identification process for identifying macro-blocks MB present within a predetermined distance from the macro-block MB related to the evaluation target motion vector (see FIG. 4). Specifically, the CPU 71 executes the block identification program 72*d*, thereby identifying macro-blocks MB satisfying the following general expression (1) among the macro-blocks MB related to comparison target motion vectors MVn other than the evaluation target motion vector MVm selected by the random selection process.

$$(Hm-Hn)^2+(Vm-Vn)^2<d \quad (1)$$

where a position of the macro-block MB related to the evaluation target motion vector MVm is Pm (Hm, Vm), a position of the macro-block MB related to the comparison target motion vector MVn is Pn (Hn, Vn), and the predetermined distance is d. Using the general expression (1), the CPU 71 identifies the macro-blocks MB present within the predetermined distance d from the macro-block MB related to the evaluation target motion vector MVm, i.e., the macro-blocks MB to be excluded from the comparison targets the motion vectors of which are to be compared with the evaluation target motion vector at the time of the global motion vector calculation process.

The global motion vector calculation program 72*e* causes the CPU 71 to function as a global motion vector calculation unit. Namely, the global motion vector calculation program 72*e* causes the CPU 71 to realize a function related to a global motion vector calculation process. That is, the CPU 71 selects one motion vector as the evaluation target motion vector from among the plural motion vectors of one of the image frames F. Further, the CPU 71 determines whether to vote for the evaluation target motion vector by comparing the evaluation target with the other motion vectors, and calculates a global motion vector of one image frame F by majority vote. Namely, the CPU 71 executes the global motion vector calculation program 72*e*, thereby gathering votes for one motion vector serving as the evaluation (vote) target selected at random from one image frame F, from the other motion vectors, and setting the motion vector gaining the most votes as the global motion vector. Specifically, 100 motion vectors MVn (Xn, Yn) (n=0 to 99), for example, are calculated from one image frame F. In this case, when an evaluation target motion vector MVk (where k is an arbitrary real number from 0 to 99) satisfies the following general expression (2) with motion vectors of the macro-blocks MB other than the macro-blocks MB identified by the block identification process set as comparison targets, the CPU 71 votes for the evaluation target motion vector MVk.

$$(Xn-Xk)^2+(Yn-Yk)^2<t \tag{2}$$

where t denotes a threshold value. By repeating the calculation with respect to n=0 to 99, the CPU 71 completes voting for the motion vector MVk.

The CPU 71 repeats the voting while changing the evaluation target motion vector MVk predetermined times and adopts the motion vector eventually gaining the most votes as the global motion vector. For example, in each of the image frames F shown in FIGS. 2 and 5, camera shake-related motion vectors (indicated by solid lines in FIGS. 2 and 5) are in an upper left oblique direction and it is preferable to select one of the camera shake-related motion vectors as the global motion vector. However, among motion vectors (indicated by broken lines in FIGS. 2 and 5) related to cars (moving objects) present in the image frames F, those related to a car at the lower left are slightly in lower left oblique direction, and those of the other cars differ in direction from the camera shake-related motion vectors in the upper left oblique direction. In this case, the macro-blocks MB present within the predetermined distance d from the macro-block related to the evaluation target motion vector MVm (macro-blocks MB within a region R surrounded by a thick line in FIG. 5) are not used for the global motion vector calculation process. This can avoid voting for the motion vectors considered to be related to the same object and can lessen the influence of moving object components on the global motion vector calculation process.

The camera shake correction program 72*f* causes the CPU 71 to realize a function related to a camera shake correction process on a picked-up image for canceling a camera shake or the like according to the global motion vector of one image frame F calculated by the global motion vector calculation process. Specifically, the CPU 71 executes the camera shake correction program 72*f*, thereby adjusting positions of the image frame F and an image frame F adjacent to the image frame F of interest relative to each other or moving the electronic imaging unit 12 or the imaging lens assembly 11 in predetermined directions, based on the global motion vector of one image frame F, to correct the camera shake in the picked-up image. The CPU 71 stores the picked-up image the camera shake is corrected in the recording medium 5.

Figure 6:
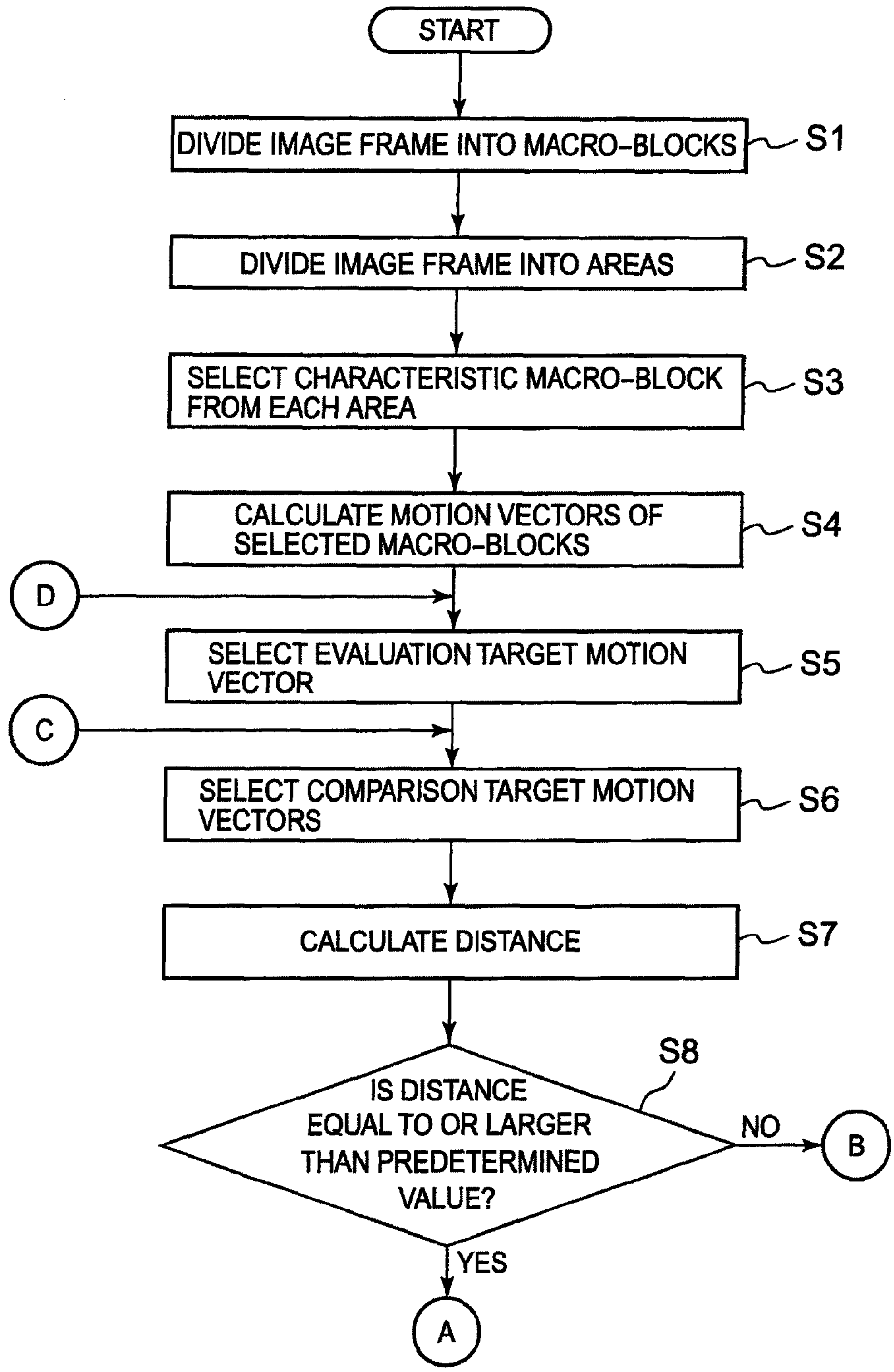
FIG. 6 is a flowchart showing an example of an operation related to an imaging process performed by the imaging device shown in FIG. 1.
Figure 7:
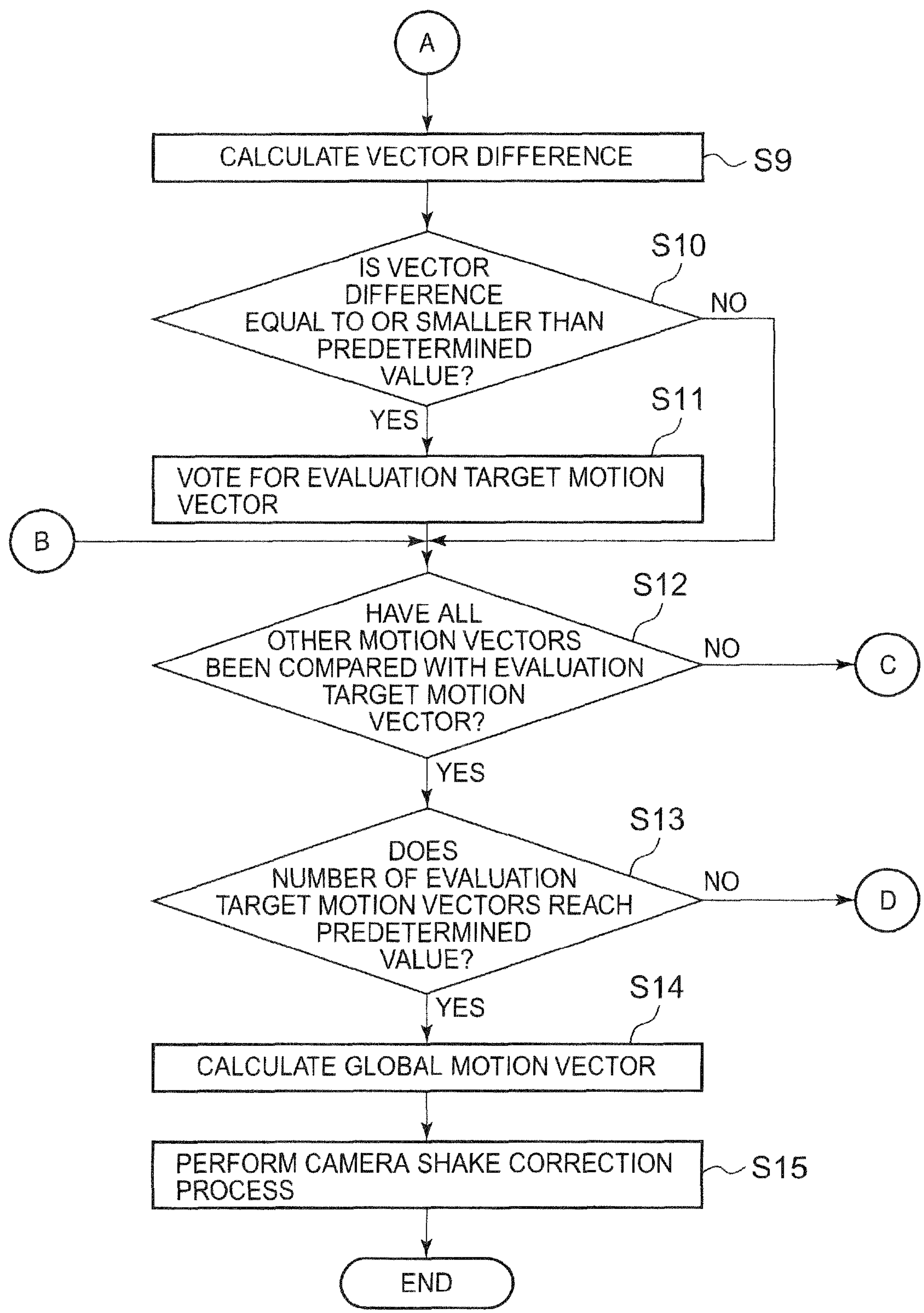
FIG. 7 is a flowchart showing the imaging process following that shown in FIG. 6.

An imaging process performed by the imaging device 100 will next be described with reference to FIGS. 6 and 7. FIGS. 6 and 7 are flowcharts showing an example of an operation related to the imaging process.

With reference to FIG. 6, when the imaging unit 1 starts imaging an object, the CPU 71 reads the block division program 72*a* from the program memory 72 and executes the block division program 72*a*. The CPU 71 thereby divides each of a plurality of image frames F (see FIG. 3) constituting the moving image information generated by the imaging unit 1, into macro-blocks MB (step S1). Next, the CPU 71 reads the motion vector calculation program 72*b* from the program memory 72 and executes the motion vector calculation program 72*b*. The CPU 71 thereby divides one image frame F into areas A each constituted by 4×4 macro-blocks MB or 16 macro-blocks MB in all (step S2; see FIG. 3), and selects one characteristic macro-block MB from each area A (step S3). The CPU 71 calculates motion vectors of all of the selected macro-blocks MB (step S4).

Thereafter, the CPU 71 reads the motion vector selection program 72*c* from the program memory 72 and executes the motion vector selection program 72*c*. The CPU 71 thereby randomly selects one evaluation target motion vector from among the plural motion vectors (step S5). The CPU 71 reads the block identification program 72*d* from the program memory 72 and executes the block identification program 72*d*. The CPU thereby selects motion vectors other than the evaluation target motion vector as comparison targets from among the plural motion vectors (step S6). Further, the CPU 71 calculates a distance based on the general expression (1) (step S7; see FIG. 4). Then, the CPU 71 determines whether the distance is equal to or larger than a predetermined value (step S8). When the CPU 71 determines that the distance is equal to or larger than the predetermined value (step S8; YES), the CPU 71 reads the global motion vector calculation program 72*e* from the program memory 72 and executes the global motion vector calculation program 72*e*. The CPU 71 thereby calculates a difference (vector difference) between the evaluation target motion vector and each of the comparison target motion vectors based on the general expression (2) (step S9). Next, the CPU 71 determines whether the vector difference is equal to or smaller than a predetermined value (step S10). When the CPU 71 determines that the vector difference is equal to or smaller than the predetermined value (step S10; YES), the CPU 71 determines that the evaluation target motion vector gathers support from the comparison target motion vectors other than the evaluation target motion vector and votes for the evaluation target motion vector (step S11).

The CPU 71 determines whether the calculation with respect to one evaluation target motion vector has been performed by setting all the other motion vectors as the comparison target motion vectors (step S12). When the CPU 71 determines at step S8 that the distance smaller than the predetermined value (step S8; NO) or determines at step S10 that the vector difference is larger than the predetermined value (step S10; NO), the CPU 71 executes a process at step S12. When the CPU 71 determines at step S12 that not all the other motion vectors are set as the comparison target motion vectors (step S12; NO), the CPU 71 returns to the process at step S6.

Thereafter, the CPU 71 determines whether the number of evaluation target motion vectors reaches a predetermined value (step S13). When the CPU 71 determines that the number of evaluation target motion vectors does not reach the predetermined value (step S13; NO), the CPU 71 returns to the process at step S5. When the CPU 71 determines that the number of evaluation target motion vectors reaches the predetermined value (step S13; YES), the CPU 71 adopts the motion vector gaining the most votes as the global motion vector (step S14). Thereafter, the CPU 71 reads the camera shake correction program **72*f* from the program memory 72 and executes the camera shake correction program 72*f*. The CPU 71 thereby performs a camera shake correction process on the picked-up image so as to cancel the camera shake or the like according to the calculated global motion vector (step S15**).

As described above, the imaging device 100 according to the present embodiment selects each of the plural motion vectors as the evaluation target motion vector, and determines whether to vote for the evaluation target motion vector by comparing the evaluation target motion vector with the other motion vectors. Further, when calculating the global motion vector of one image frame F by majority vote, the imaging device 100 identifies macro-blocks MB present within the predetermined distance from the macro-block MB related to the evaluation target motion vector and excludes the identified macro-blocks MB from comparison targets with which the evaluation target motion vector is compared. Namely, when motion vectors related to moving object components different from the camera shake-related motion vectors are locally present in one image frame F, the imaging device 100 does not use the motion vectors related to the macro-blocks MB present within the predetermined distance from the macro-block MB related to the evaluation target motion vector for the calculation of the global motion vector. This can avoid voting for the motion vectors considered to be related to the same object and can lessen the influence of moving object components on the global motion vector calculation process. Therefore, the imaging device 100 according to the present embodiment can appropriately calculate the global motion vector from the motion vectors related to a background or the like evenly distributed in the entire image frame F.

Moreover, the imaging device 100 according to the embodiment randomly selects one evaluation target motion vector, thereby making it possible to evenly select evaluation target motion vectors from one image frame F. By setting the number of evaluation target or comparison target motion vectors to be sufficiently large, it is possible to appropriately obtain the solution of the total set. Therefore, the imaging device 100 according to the embodiment can improve processing efficiency and accelerate the processing rate.

The present invention is not limited to the embodiment mentioned above, and various modifications and changes in design can be made without departing from the scope or spirit of the present invention. At step S13 in the imaging process, when the CPU 71 determines that the number of evaluation target motion vectors reaches the predetermined value, the CPU 71 decides the global motion vector. However, the present invention is not limited to this step. For example, when determining that the number of votes for one evaluation target motion vector reaches a majority, the CPU 71 can adopt the evaluation target motion vector as the global motion vector. Furthermore, in the above embodiment, during the global motion vector calculation process, the CPU 71 selects each of the plural motion vectors as the evaluation target motion vector, determines whether to vote for the evaluation target motion vector by comparing the evaluation target motion vector with the other motion vectors, and calculates the global motion vector of one image frame F by majority vote. However, the global motion vector calculation method is not limited to this method. Namely, an arbitrary global motion vector calculation method can be adopted as long as the method relates to the process of calculating the global motion vector of one image frame by comparing one evaluation target motion vector with the other motion vectors.

Furthermore, in the above embodiment, during the calculation of the global motion vector, a macro-block MB is randomly selected. However, the present invention is not limited to this method. For example, a macro-block MB located at a preset position in each area A may be selected.

Moreover, the configuration of the imaging device 100 described in the embodiment is given only for illustrative purposes and the configuration of the imaging device 100 is not limited to that described in the embodiment. Further, the imaging device 100 is shown as an example of the image processing apparatus. However, the image processing apparatus is not limited to the imaging device 100. For example, a plurality of image frames F constituting a moving image obtained by the imaging unit 1 may be output to the external device connected to the imaging device 100 via the USB terminal 6. The external device can perform such processes as the block division process, the motion vector calculation process, the motion vector selection process, the block identification process, and the global motion vector calculation process related to the camera shake correction.

Besides, in the above embodiment, the imaging device 100 is configured to realize the functions as the block division unit, the motion vector calculation unit, the block identification unit, and the global motion vector calculation unit, and the motion vector selection unit by causing the CPU 71 to execute the predetermined programs or the like. However, the configuration of the imaging device 100 is not limited to this configuration. For example, the imaging device 100 may be configured to include logic circuits or the like for realizing the corresponding functions.

What is claimed is:

1. An image processing apparatus comprising:

a block division unit that divides at least one image frame out of a plurality of image frames constituting moving image information into a plurality of blocks;

a motion vector calculation unit that tracks each of the blocks that are obtained by the block division unit, in one of two image frames before and after the one image frame, and calculates respective motion vectors for each of the blocks;

a motion vector selection unit which selects an evaluation target motion vector from among the motion vectors calculated by the motion vector calculation unit;

a block identification unit which sets, as comparison target motion vectors, motion vectors corresponding to blocks which are outside a predetermined radial physical distance from a block corresponding to the evaluation target motion vector; and a global motion vector determining unit that determines a global motion vector of the one image frame based on a comparison of the evaluation target motion vectors, wherein the global motion vector determining unit operates a plurality of times with respect to a plurality of different evaluation target motion vectors, judges whether each of the evaluation target motion vectors satisfies a condition based on results of the comparisons, and determines the global motion vector of the one image frame based on results of the judging.

2. An image processing apparatus according to claim 1, further comprising a camera shake correction unit that corrects a camera shake in the image frame by adjusting a position of the image frame according to the global motion vector.

3. An image processing apparatus according to claim 1, further comprising a camera shake correction mechanism that is driven according to the global motion vector.

4. A non-transitory computer readable recording medium having a computer program stored thereon which is executable by a computer included in an image processing apparatus, the program causing the computer to execute functions comprising:

dividing at least one image frame out of a plurality of image frames constituting moving image information into a plurality of blocks;

tracking each of the obtained blocks, in one of two image frames before and after the one image frame, and calculating respective motion vectors for each of the blocks;

selecting an evaluation target motion vector from among the calculated respective motion vectors for each of the blocks;

setting, as comparison target motion vectors, motion vectors corresponding to blocks which are outside a predetermined radial physical distance from a block corresponding to the evaluation target motion vector; and determining a global motion vector of the one image frame based on a comparison of the evaluation target motion vector with each of the comparison target motion vectors, wherein the determining is performed a plurality of times with respect to a plurality of different evaluation target motion vectors, and comprises judging whether each of the evaluation target motion vectors satisfies a condition based on results of the comparisons, and determining the global motion vector of the one image frame based on results of the judging.

5. An image processing method comprising a shake correction function, the shake correction function being performed by:

dividing at least one image frame out of a plurality of image frames constituting moving image information into a plurality of blocks;

tracking each of the obtained blocks, in one of two image frames before and after the one image frame, and calculating respective motion vectors for each of the blocks;

selecting an evaluation target motion vector from among the calculated respective motion vectors for each of the blocks;

setting, as comparison target motion vectors, motion vectors corresponding to blocks which are outside a predetermined radial physical distance from a block corresponding to the evaluation target motion vector; and determining a global motion vector of the one image frame based on a comparison of the evaluation target motion vector with each of the comparison target motion vectors, wherein the determining is performed a plurality of times with respect to a plurality of different evaluation target motion vectors, and comprises judging whether each of the evaluation target motion vectors satisfies a condition based on results of the comparisons, and determining the global motion vector of the one image frame based on results of the judging.

* * * * *